United States Patent
Fuoss

(10) Patent No.: US 7,021,268 B1
(45) Date of Patent: Apr. 4, 2006

(54) CRANKSHAFT WITH AIRFLOW INDUCING SURFACES

(75) Inventor: Klaus Fuoss, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/978,099

(22) Filed: Oct. 29, 2004

(51) Int. Cl.
*F01M 1/00* (2006.01)

(52) U.S. Cl. .................... 123/196 W; 74/604
(58) Field of Classification Search ......... 123/195 HC, 123/195 P, 196 W; 74/604
See application file for complete search history.

(56) References Cited

U.S. PATENT DOCUMENTS

| | | | |
|---|---|---|---|
| 4,015,908 A | 4/1977 | Ashley | 403/274 |
| 4,342,236 A | 8/1982 | Everts | 74/603 |
| 4,534,241 A | 8/1985 | Remmerfelt et al. | 74/597 |
| 4,697,556 A | 10/1987 | Mondek et al. | 123/193 HC |
| 4,768,397 A | 9/1988 | Adams | 74/603 |
| 4,890,587 A * | 1/1990 | Holtermann | 123/195 HC |
| 5,031,591 A | 7/1991 | Shinoda et al. | 123/196 W |
| 5,309,877 A * | 5/1994 | Shigedomi et al. | 123/195 P |
| 5,899,120 A | 5/1999 | Leith | 74/603 |
| 6,164,259 A | 12/2000 | Brogdon et al. | 123/192.2 |
| 6,418,902 B1 | 7/2002 | Ericson | 123/192.2 |

* cited by examiner

*Primary Examiner*—Noah P. Kamen
(74) *Attorney, Agent, or Firm*—William D. Lanyi

(57) ABSTRACT

A crankshaft is provided with a plurality of counterweights which are asymmetrically formed so that one surface has a shape which induces a flow of air and oil mist in a preselected and preferred direction. This shape also improves the aerodynamic characteristic of the counterweight and reduces the friction that the counterweight would otherwise experience as it rotates about the rotational axis of the crankshaft. A tapered surface is provided on a lower surface of each crankshaft and the tapered surface is positioned at a leading edge of each counterweight.

24 Claims, 3 Drawing Sheets

CRANKSHAFT WITH AIRFLOW INDUCING SURFACES

BACKGROUND OF THE INVENTION

1. Field of the Invention

The present invention is generally related to an engine with a crankshaft and, more particularly, to a crankshaft that provides surfaces which induce a flow of air and oil mist in a preferred direction when the crankshaft is rotated about its rotational axis.

2. Description of the Prior Art

Those skilled in the art of internal combustion engines are aware of many different types of crankshafts. The purpose of the crankshaft is to convert the reciprocal movement of pistons within the internal combustion engine to rotational movement of an output shaft. Counterweights are often used to balance the rotational forces that result from the rotation of the crankshaft about its rotational axis.

U.S. Pat. No. 4,015,908, which issued to Ashley on Apr. 5, 1977, describes a multiple piece crankshaft which is produced by chamfering one end of each crank arm opening and providing keyways in and parallel to the chamfered surfaces. Each crankshaft and crankpin is provided with a shoulder and is positioned in a crank arm opening with the shoulder opposite the chamfer. The projecting ends of the shaft and pin are cold formed into the respective chamfer and keyways.

U.S. Pat. No. 4,342,236, which issued to Everts on Aug. 3, 1982, describes a crankshaft with laminated counterweights. The counterweight comprises a plurality of substantially flat plates, each of which has a first and a second shaft mounting hole therethrough and at least one depression on one side and a boss on the other side.

U.S. Pat. No. 4,534,241, which issued to Remmerfelt et al. on Aug. 13, 1985, describes a crankshaft for combustion engines. The crankshaft comprises a number of components joined to each other. Each component comprises a counterweight, a portion of a main bearing journal, and a portion of a crank bearing journal.

U.S. Pat. No. 4,697,556, which issued to Mondek et al. on Oct. 6, 1987, describes a marine propulsion device crankshaft bearing arrangement. The marine propulsion device comprises a lower unit including a rotatably mounted propeller and an internal combustion engine drivingly connected to the propeller. Within an engine block of the outboard motor, a crankshaft is rotatably supported by the engine block and includes an end portion projecting from the engine block. A flywheel includes a hub that is mounted on the end portion of the crankshaft.

U.S. Pat. No. 4,768,397, which issued to Adams on Sep. 6, 1988, describes a lubrication scheme for pressure lubricated crankshafts with counterweight holes for crankshaft balance. A method and apparatus for counterbalancing an internal combustion engine while maintaining a lubricant flow path for supplying lubricant to a crankshaft connecting rod journal is described. A generally cylindrical mass of crankshaft material is removed from a region of the crankshaft located coaxial with the connecting rod journal for engine balancing purposes with that removed mass including a portion of the lubricant passageway.

U.S. Pat. No. 5,031,591, which issued to Shinoda et al. on Jul. 16, 1991, describes an overhead cam vertical crankshaft engine. The engine comprises a vertically disposed crankshaft having a first timing pulley at its lower end. The need for lubrication for the transmission mechanism between the crankshaft and the cam shaft is substantially eliminated and the noise generation is reduced.

U.S. Pat. No. 5,899,120, which issued to Leith on May 4, 1999, describes a crankshaft with a laminated counterweight. The counterweight is used for connecting the main shaft with the crankpin of a crankshaft in which the counterweight includes a pair of end laminations which are circular in shape and have a central opening dimension to receive the main shaft and a crank pin opening radially spaced from the central opening and dimensioned to receive the crankpin.

U.S. Pat. No. 6,164,259, which issued to Brogdon et al. on Dec. 26, 2000, describes an engine balance apparatus and accessory drive device. The balancing mechanism for an engine that has a rotating crankshaft and reciprocating pistons is described. The balancing mechanism may comprise a first balance mass non-rotatably affixed to the crankshaft and a second balance mass rotatably supported on the crankshaft.

U.S. Pat. No. 6,418,902, which issued to Ericson on Jul. 16, 2002, describes a composite full circle crankshaft counterweight. Composite crankshaft counterweights are described for a two-cycle internal combustion engine. They include a "T"-shaped counterweight surrounded by a cup-shaped retainer that holds lightweight inserts against the counterweight.

The patents described above are hereby expressly incorporated by reference in the description of the present invention.

Many different types of counterweights are well known to those skilled in the art. Counterweights are typically used for the sole purpose of balancing the crankshaft to avoid vibration when the crankshaft rotates about its rotational axis. It would be significantly beneficial if the crankshaft could be shaped in such a way that it also performs the helpful function of assisting the flow of air and oil mist in a preferred direction in the vicinity of the crankshaft.

SUMMARY OF THE INVENTION

An engine, made in accordance with a preferred embodiment of the present invention, comprises a crankshaft, supported within the engine for rotation about a rotational axis, and a plurality of counterweights on the crankshaft. In a preferred embodiment of the present invention, each of the plurality of counterweights is asymmetrically shaped to have a chamfered surface and an unchamfered surface. The chamfered and unchamfered surfaces are located on opposite sides of a counterweight reference plane which is perpendicular to the rotational axis of the crankshaft.

In a preferred embodiment of the present invention, the chamfered surface is configured to induce a fluid flow in a preselected direction which is generally parallel to the rotational axis. The preselected direction of fluid flow is downward in a preferred embodiment of the present invention and the rotational axis is vertical. The chamfered surface is below the unchamfered surface on each of the plurality of counterweights and, in a particularly preferred embodiment of the present invention, the chamfered surface is approximately twenty two degrees to the rotational axis. In other words, a plane of the chamfered surface intersects the counterweight reference plane which is perpendicular to the rotational axis and the angle between those two intersecting planes is approximately twenty two degrees in a particularly preferred embodiment of the present invention.

In a preferred embodiment of the present invention the chamfered surface comprises a tapered portion which is disposed at a leading edge of an associated one of the plurality of counterweights when the crankshaft rotates about the rotational axis in its preferred direction of rotation. The tapered portion can be disposed at a radially outermost part of the associated one of the plurality of counterweights. In a preferred embodiment, the present invention is intended for use with a crankshaft of an engine that is a powerhead for an outboard motor. Each of the counterweights can be formed as an integral portion of the crankshaft, but it should be understood that it is not required in all embodiments of the present invention that the counterweights be forged as an integral portion with the other components or portions of the crankshaft structure.

BRIEF DESCRIPTION OF THE DRAWINGS

The present invention will be more fully and completely understood from a reading of the description of the preferred embodiment in conjunction with the figures, in which.

DESCRIPTION OF THE PREFERRED EMBODIMENT

Figure 1:
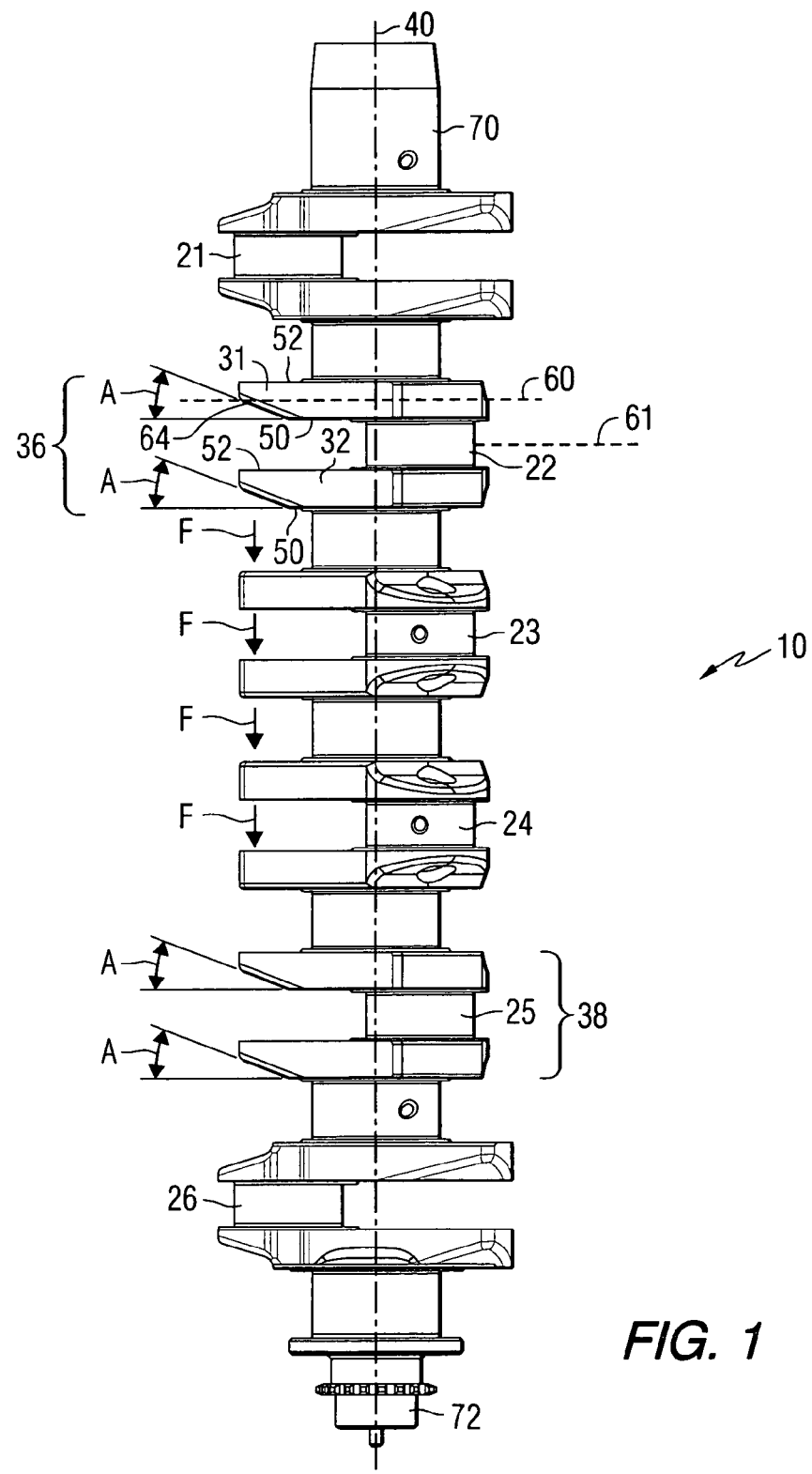
FIG. 1 is a side view of a crankshaft made in accordance with a preferred embodiment of the present invention.

Throughout the description of the preferred embodiment of the present invention, like components will be identified by like reference numerals.

In FIG. 1 a crankshaft 10 is shown with a plurality of connecting rod bearing surfaces, 21–26, and a plurality of counterweights which are arranged in pairs. For example, two counterweights, 31 and 32, are arranged on opposing sides of the connecting rod bearing 22 to define a pair 36 of counterweights. This pair 36 of counterweights is one of six pairs of counterweights shown in FIG. 1. Another pair is identified by reference numeral 38.

The crankshaft 10 is supported within an engine for rotation about a rotational axis 40. The basic concept of the present invention will be described with particular reference to the pair 36 of counterweights which are individually identified in FIG. 1 by reference numerals 31 and 32, but it should be understood that in a preferred embodiment of the present invention each of the twelve counterweights is similarly configured. Although it is not necessary in all embodiments of the present invention that each of the counterweights is identically shaped to all other counterweights, this is generally true in the particularly preferred embodiment of the present invention illustrated in FIG. 1.

With continued reference to FIG. 1, each of the plurality of counterweights is asymmetrically shaped to have a chamfered surface 50 and an unchamfered surface 52. With particular reference to counterweight 31, it can be seen that the chamfered and unchamfered surfaces, 50 and 52, are located on opposite sides of a counterweight reference plane 60 which is perpendicular to the rotational axis 40. The chamfered surface 50 is configured to induce a fluid flow in a preselected direction which is generally parallel to the rotational axis 40. This direction is represented by arrows F in FIG. 1. In addition, the pair 36 of counterweights is asymmetrical about a central reference plane 61 which is disposed between the two counterweights of the pair 36, as illustrated in FIG. 1.

In a particularly preferred embodiment of the present invention, the crankshaft 10 is a crankshaft used in an engine which is a powerhead of an outboard motor. As such, the rotational axis 40 is generally vertical when the outboard motor is in use and the preselected direction F is downward. The chamfered surface 50 is therefore disposed below the unchamfered surface 52. The chamfered surface 50 comprises a tapered portion 64. The angle between the tapered portion 64 and the remaining part of the chamfered surface 50 is approximately twenty two degrees in a particularly preferred embodiment of the present invention. This angle is represented by arrow A in FIG. 1. It should be understood that only two pairs, 36 and 38, of the counterweights shown in FIG. 1 clearly represent the angle A. This is true because FIG. 1 is a plan view of the crankshaft 10 and the various pairs of counterweights are rotationally positioned about the rotational axis 40. As a result, the two pairs, 36 and 38, clearly represent the angle A between the tapered surface 64 and the remaining portion of the chamfered surface 50 in a true manner that allows the angle to be viewed. This will be discussed in greater detail below.

When the crankshaft 10 is assembled within an engine of an outboard motor, it has a top end 70 and a bottom end 72. Since the tapered portion 64 of the chamfered surface 50 is disposed at a leading edge of its associated one of the plurality of counterweights when the crankshaft rotates about the rotational axis 40, the tapered surface induces the flow of air and oil mist in the preselected direction F. This preselected direction F is downward and induces the flow of oil mist toward an oil sump of the outboard motor which is located below or near the bottom of the crankshaft 10.

With continued reference to FIG. 1, each of the counterweights is formed, by forging, as an integral part of the crankshaft 10 in a preferred embodiment of the present invention. However, as is well known to those skilled in the art, counterweights can alternatively be individually produced and attached to the other portions of the crankshaft 10. Therefore, the integral nature of the counterweights in a preferred embodiment of the present invention is not a requirement in all embodiments.

Figure 2:
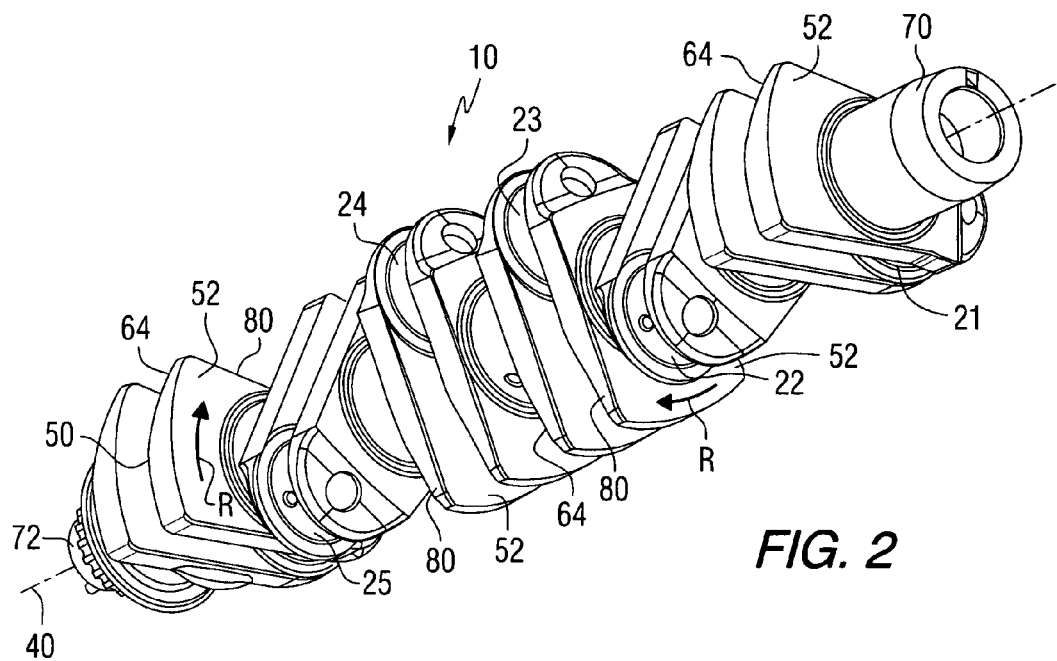
FIGS. 2 and 3 are isometric representations of crankshafts made in accordance with a preferred embodiment of the present invention.
Figure 3:
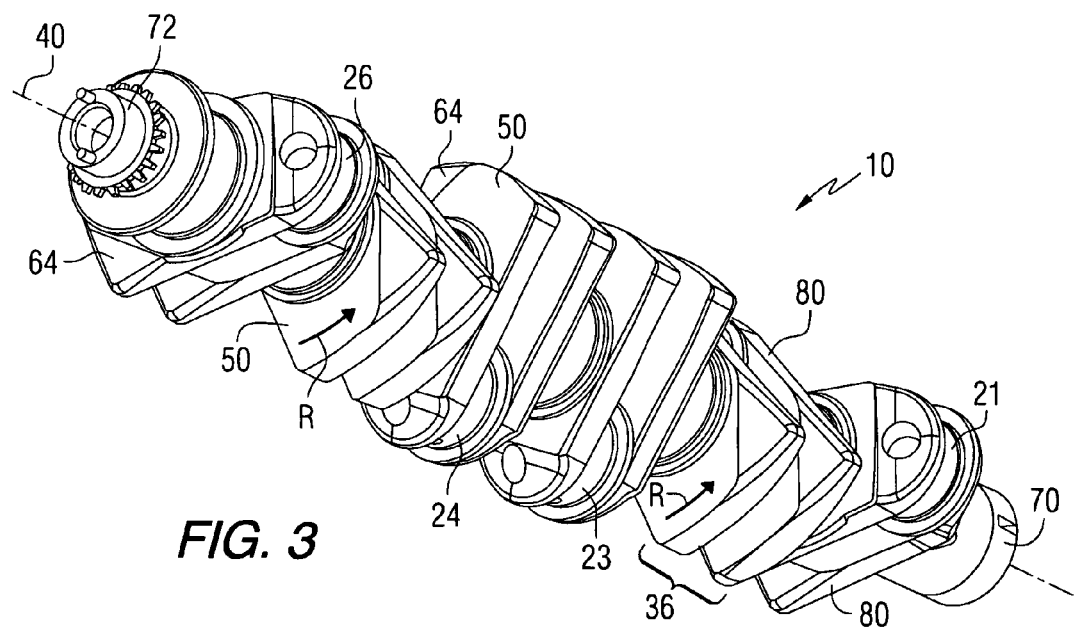

FIGS. 2 and 3 show two isometric views of a crankshaft 10 made in accordance with a preferred embodiment of the present invention. In FIGS. 2 and 3, many of the components described above in conjunction with FIG. 1 are identified by the same reference numerals used in conjunction with that illustration in FIG. 1, but the isometric nature of the illustrations, in FIGS. 2 and 3, does not permit each and every characteristic to be similarly identified.

With reference to FIGS. 2 and 3, it can be seen that the tapered portion 64 of each of the chamfered surfaces 50 is disposed at a leading edge 80 of its representative counterweight. The direction of rotation of the crankshaft 10 is identified by arrow R in FIGS. 2 and 3. Although the preselected direction F of airflow is not shown in FIGS. 2 and 3, it should be understood that this preselected direction of flow is from the upper end 70 to the lower end 72 of the crankshaft 10.

Figure 4:
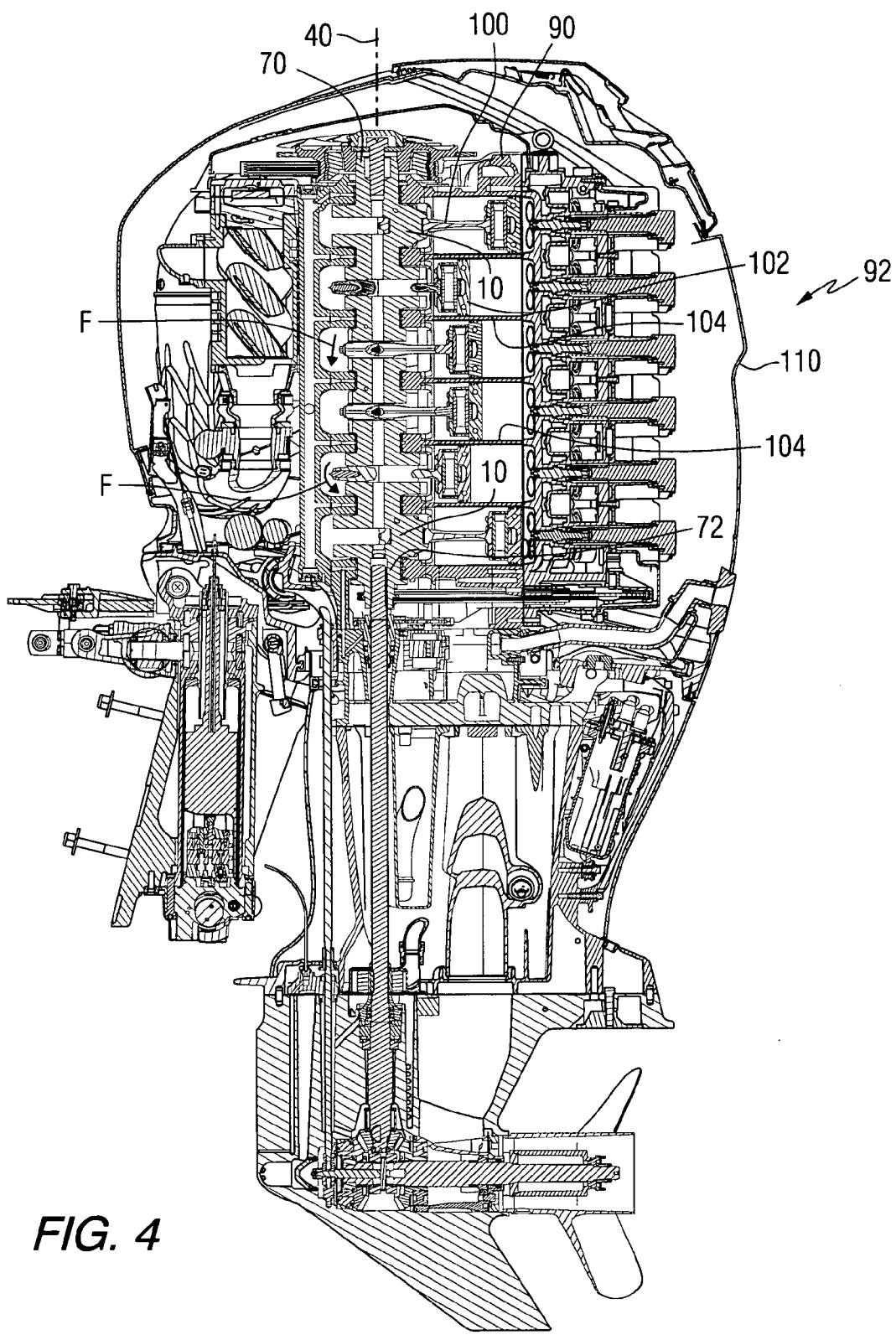
FIG. 4 is a side section view of an outboard motor showing the crankshaft disposed within an engine.

FIG. 4 is a section view of an engine 90 of an outboard motor 92. The crankshaft 10 is shown vertically supported for rotation about the rotational axis 40 with its upper end 70 and its lower end 72. The preselected direction of flow is represented by arrows F. It should be understood that, although only two arrows F are shown in FIG. 4 for purposes of clarity, the preselected direction of flow F for the air and oil mist is induced by each of the tapered portions 64 of the chamfered surfaces 50 of the crankshaft 10 described in conjunction with FIGS. 1–4.

With continued reference to FIG. 4, the connecting rods 100 are attached to the crankshaft 10 at the connecting rod bearing surfaces, 21–26, which are described above in conjunction with FIGS. 1–3. Each of these connecting rods 100 is attached to a piston 102 which is supported for reciprocal motion within an associated cylinder 104. Also shown in FIG. 4 is a cowl structure 110 which is used as a cover over the engine 90 when the engine 90 is used as a powerhead for an outboard motor. Although not shown in FIG. 4, an oil sump is located below the lower end 72 of the crankshaft 10. The induced flow of air and oil mist in the preselected direction F causes the oil to move in this preferred direction toward the oil sump. In addition, the shape of the counterweights improves its aerodynamic performance and reduces the friction that would otherwise be caused by the movement of an untapered surface through the air and oil mist within the crankshaft chamber.

With reference to FIGS. 1–4, it can be seen that the present invention provides an engine 90 which, in a preferred embodiment of the present invention, comprises a crankshaft 10 having an airflow inducing surface 64 which is rotatable about a rotational axis 40 of the crankshaft 10. The crankshaft is supported by the engine 90 for rotation about the rotational axis 40 which, in a preferred embodiment of the present invention, is vertical. The airflow inducing surface 64 is formed on one or more counterweights of the crankshaft 10. As a result, the counterweight is asymmetrically shaped to have a chamfered surface 50 and an unchamfered surface 52. The chamfered surface 50 provides the airflow inducing surface 64 in a particularly preferred embodiment of the present invention. It should be understood that other surfaces of the crankshaft 10 or attached to the crankshaft 10 could alternatively be used to induce this preferred flow of air and oil mist. The chamfered and unchamfered surfaces, 50 and 52, are located on opposite sides of a counterweight reference plane 60 in a preferred embodiment of the present invention. The counterweight reference plane 60 is perpendicular to the rotational axis 40. The pair 36 of counterweights are also asymmetrical about the central reference plane 61 which is located between the two counterweights, 31 and 32, of the pair and which is generally perpendicular to the rotational axis. In a preferred embodiment, the counterweight is formed as an integral portion of the crankshaft 10, but this is not necessary in all embodiments. The airflow inducing surface 64 is disposed at an angle of between twenty and twenty four degrees to the rotational axis 40 in a preferred embodiment of the present invention. This has been found to be efficient and satisfactory to perform the desired task of inducing the airflow. An angle of twenty two degrees has been determined to be most efficient for one particularly preferred embodiment of the present invention. However, it should be understood that the specific magnitude of this angle A is not limiting to the present invention.

Although counterweights of crankshafts have been made in many different shapes and configurations, it should be understood that the advantages provided by the present invention relate to the asymmetry of the chamfered and unchamfered surfaces, 50 and 52, and not only to the provision of a tapered surface 64. As an example, if tapered surfaces were provided on both opposite sides of each counterweight, the airflow would not be induced to move in the preselected direction but, would be induced to move in directions caused by the various tapered surfaces which would include both upward and downward directions. The asymmetry of the present invention causes the tapered surfaces to cooperate in inducing a desired flow of air and oil mist in the preselected direction F. Similarly, if the pair 36 of counterweights is symmetrical about central reference plane 61, the advantageous effect of the present invention would not be achieved to the degree provided by the present invention. Therefore, in a preferred embodiment of the present invention, the pair 36 of counterweights is asymmetrical about the central reference plane 61 and each counterweight, such as 31 and 32, is asymmetrical about its individual counterweight reference plane 60.

Although the present invention has been described with particular specificity and illustrated to show a preferred embodiment, it should be understood that alternative embodiments are also within its scope.

I claim:

1. An engine, comprising:
a crankshaft supported within said engine for rotation about a rotational axis; and
a plurality of counterweights on said crankshaft, each of said plurality of counterweights being asymmetrically shaped to have a chamfered surface and an unchamfered surface, said chamfered and unchamfered surfaces being located on opposite sides of a counterweight reference plane which is perpendicular to said rotational axis, at least two of said plurality of counterweights being arranged as a pair which is asymmetrical about a central reference plane which is between said pair and perpendicular to said rotational axis.

2. The engine of claim 1, wherein:
said chamfered surface is configured to induce a fluid flow in a preselected direction which is generally parallel to said rotational axis.

3. The engine of claim 2, wherein:
said preselected direction is downward.

4. The engine of claim 1, wherein:
said rotational axis is vertical.

5. The engine of claim 4, wherein:
said chamfered surface is disposed below said unchamfered surface.

6. The engine of claim 1, wherein:
said chamfered surface is approximately twenty two degrees to said rotational axis.

7. The engine of claim 1, wherein:
said chamfered surface comprises a tapered portion which is disposed at a leading edge of an associated one of said plurality of counterweights when said crankshaft rotates about said rotational axis.

8. The engine of claim 7, wherein:
said tapered portion is disposed at a radially outermost part of said associated one of said plurality of counterweights.

9. The engine of claim 1, wherein:
said engine is an outboard motor powerhead.

10. The engine of claim 1, wherein:
each of said counterweights is formed as an integral portion of said crankshaft.

11. An engine, comprising:
a crankshaft supported within said engine for rotation about a rotational axis; and
a plurality of counterweights extending from said rotational axis of said crankshaft, each of said plurality of counterweights being shaped to induce a fluid flow in a preselected direction which is generally parallel to said rotational axis.

12. The engine of claim 11, wherein:
each of said plurality of counterweights is asymmetrically shaped to have a chamfered surface and an unchamfered surface, said chamfered and unchamfered surfaces being located on opposite sides of a counterweight reference plane which is perpendicular to said rotational axis, at least two of said plurality of counterweights being arranged as a pair which is asymmetrical about a central reference plane which is between said pair and perpendicular to said rotational axis.

13. The engine of claim 12, wherein:
said chamfered surface is disposed below said unchamfered surface.

14. The engine of claim 11, wherein:
said preselected direction is downward.

15. The engine of claim 14, wherein:
said rotational axis is vertical.

16. The engine of claim 12, wherein:
said chamfered surface is formed at an angle of between twenty and twenty four degrees to said rotational axis.

17. The engine of claim 16, wherein:
said chamfered surface comprises a tapered portion which is disposed at a leading edge of an associated one of said plurality of counterweights when said crankshaft rotates about said rotational axis.

18. he engine of claim 17, wherein:
said tapered portion is disposed at a radially outermost part of said associated one of said plurality of counterweights.

19. The engine of claim 11, wherein:
each of said counterweights is formed as an integral portion of said crankshaft.

20. An engine, comprising:
a crankshaft having an airflow inducing surface which is rotatable about a rotational axis of said crankshaft, said airflow inducing surface being shaped to induce an airflow in a direction which is generally parallel to said rotational axis, said crankshaft being supported by said engine for rotation about said rotational axis, said rotational axis being generally vertical.

21. The engine of claim 20, wherein:
said airflow inducing surface is formed on a counterweight of said crankshaft.

22. The engine of claim 21, wherein:
said counterweight is asymmetrically shaped to have a chamfered surface and an unchamfered surface, said chamfered surface providing said airflow inducing surface, said chamfered and unchamfered surfaces being located on opposite sides of a counterweight reference plane which is perpendicular to said rotational axis, at least two of said counterweights being arranged as a pair which is asymmetrical about a central reference plane which is between said pair and perpendicular to said rotational axis.

23. The engine of claim 20, wherein:
said counterweight is formed as an integral portion of said crankshaft.

24. The engine of claim 20, wherein:
said airflow inducing surface is disposed at an angle of between twenty and twenty four degrees to said rotational axis.

\* \* \* \* \*